(12) United States Patent
Ito

(10) Patent No.: US 7,882,919 B2
(45) Date of Patent: Feb. 8, 2011

(54) SHAFT DRIVE DEVICE

(75) Inventor: Shinji Ito, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 161 days.

(21) Appl. No.: 12/393,587

(22) Filed: Feb. 26, 2009

(65) Prior Publication Data

US 2009/0247309 A1 Oct. 1, 2009

(30) Foreign Application Priority Data

Mar. 25, 2008 (JP) .............................. 2008-077299

(51) Int. Cl.
*B62M 15/00* (2006.01)
(52) U.S. Cl. ...................................... 180/226; 180/219
(58) Field of Classification Search .................. 180/226, 180/219, 221
See application file for complete search history.

(56) References Cited

U.S. PATENT DOCUMENTS

| 4,436,173 | A | * | 3/1984 | Takahashi | 180/226 |
|---|---|---|---|---|---|
| 4,811,810 | A | * | 3/1989 | Watanabe | 180/215 |
| 4,905,787 | A | * | 3/1990 | Morin | 180/209 |
| 5,775,457 | A | * | 7/1998 | Handa et al. | 180/344 |
| 7,533,751 | B2 | * | 5/2009 | Handa et al. | 180/210 |
| 7,665,562 | B2 | * | 2/2010 | Utsumi et al. | 180/226 |
| 2008/0006464 | A1 | * | 1/2008 | Utsumi et al. | 180/226 |
| 2010/0078250 | A1 | * | 4/2010 | Nimura et al. | 180/226 |

FOREIGN PATENT DOCUMENTS

JP 62-18383 A 1/1987

* cited by examiner

*Primary Examiner*—Lesley Morris
*Assistant Examiner*—Tashiana Adams
(74) *Attorney, Agent, or Firm*—Birch, Stewart, Kolasch & Birch, LLP

(57) ABSTRACT

A shaft of a pinion gear is engaged with a ring gear extends toward the front side in a final gear case that is provided in a power transmission system between a power unit and a wheel. Splines are provided on each of an outer circumference of the shaft, and on an inner circumference of a cylindrical portion of a pinion joint that forms a receiving portion of a joint provided at the rear end of a drive shaft for transmitting power from the power unit to the pinion gear. The two splines are engaged with each other. The pinion joint is fixed to the pinion gear by a bolt that is threadedly engaged with a threaded portion formed at the lower portion of a hole in the pinion gear shaft. A flexible portion of the bolt is formed between a head portion and the threaded portion of the bolt.

20 Claims, 6 Drawing Sheets

SHAFT DRIVE DEVICE

CROSS-REFERENCE TO RELATED APPLICATION

The present application claims priority under 35 U.S.C. §119 to Japanese Patent Application No. 2008-077299, filed Mar. 25, 2008, the entire contents of which are hereby incorporated by reference.

BACKGROUND OF THE INVENTION

1. Field of the Invention

The present invention relates to a shaft drive device. The present invention relates to a shaft drive device that is suitable for driving a wheel of, for example, a vehicle such as a motorcycle.

2. Description of Background Art

In the past, for example, as disclosed in JP-A No. S62-18383, there has been known a shaft drive device where a shaft of a pinion gear (12) engaged with a ring gear (15) extends toward a power unit in a final gear case (10) that is provided in a power transmission system between an engine used as the power unit and a rear wheel, a spline is provided on the outer circumference of the shaft, a spline is provided on the inner circumference of a cylindrical portion of a pinion joint that forms a receiving portion of a joint provided at a rear end of a propeller shaft (8) for transmitting power from the power unit to the pinion gear (12), and the spline of the pinion joint and the spline of the pinion gear (12) are engaged with each other so that the pinion gear is spline-connected to the pinion joint (11).

Since the pinion gear and the pinion joint are spline-connected to each other in tie above-mentioned shaft drive device in the related art, the pinion gear and the pinion joint can slide relative to each other in the axial direction thereof.

For this reason, the device in the related art has had a problem in that noise or vibration caused by the sliding is generated.

SUMMARY AND OBJECTS OF THE INVENTION

An object of the present invention is to provide a shaft drive device that addresses the above-mentioned problem and can reduce noise or vibration.

In order to achieve the above-mentioned object, according to an embodiment of the present invention, there is provided a shaft drive device where a shaft of a pinion gear engaged with a ring gear extends toward a power unit in a final gear case that is provided in a power transmission system between the power unit and a wheel, a spline is provided on the outer circumference of the shaft, a spline is provided on the inner circumference of a cylindrical portion of a pinion joint that forms a receiving portion of a joint provided at a rear end of a drive shaft for transmitting power from the power unit to the pinion gear, and the spline of the pinion joint and the spline of the pinion gear are engaged with each other so that the pinion gear is spline-connected to the pinion joint. A hole is formed at the shaft of the pinion gear in an axial direction thereof and a threaded portion is formed at a lower portion of the hole, the pinion joint is fixed to the pinion gear by a bolt that is threadedly engaged with the threaded portion of the hole, and a flexible portion is formed between a head portion of the bolt and a threaded portion of the bolt.

According to the shaft drive device, since being fixed to each other by the bolt, the pinion gear and the pinion joint cannot slide relative to each other in the axial direction.

Therefore, noise or vibration, which is caused by the sliding of the pinion gear and the pinion joint, is not generated.

In addition, the hole is formed at the shaft of the pinion gear in the axial direction thereof, the threaded portion is formed at the lower portion of the hole, and the bolt is threadedly engaged with the threaded portion of the hole, so that the pinion joint is fixed to the pinion gear. In this case, the flexible portion is formed between the head portion and the threaded portion of the bolt. Accordingly, even though a force is applied to the pinion joint in an oscillation direction and a force is thus applied to the seating face of the head portion of the bolt in a loosening direction, the force is absorbed between the head portion and the threaded portion of the bolt by the flexible portion. Therefore, the surface pressure of the seating face is maintained, so that the bolt is hardly loosened. As a result, noise or vibration is not generated reliably.

The wheel is a rear wheel that is supported at a rear fork, which is swingably provided at a vehicle body, by an axle. If the final gear case is supported by the axle, preferably, it is preferable that the rotation of the final gear case be prevented by a torque rod for connecting an outer circumferential portion of the final gear case to the rear fork.

Accordingly, as compared to a case where the other end of the torque rod of which one end is connected to the outer circumferential portion of the final gear case is connected to a vehicle body, it is possible to suppress the oscillation of the pinion joint Therefore, the bolt is hardly loosened. As a result, it is possible to reliably prevent noise or vibration from being generated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
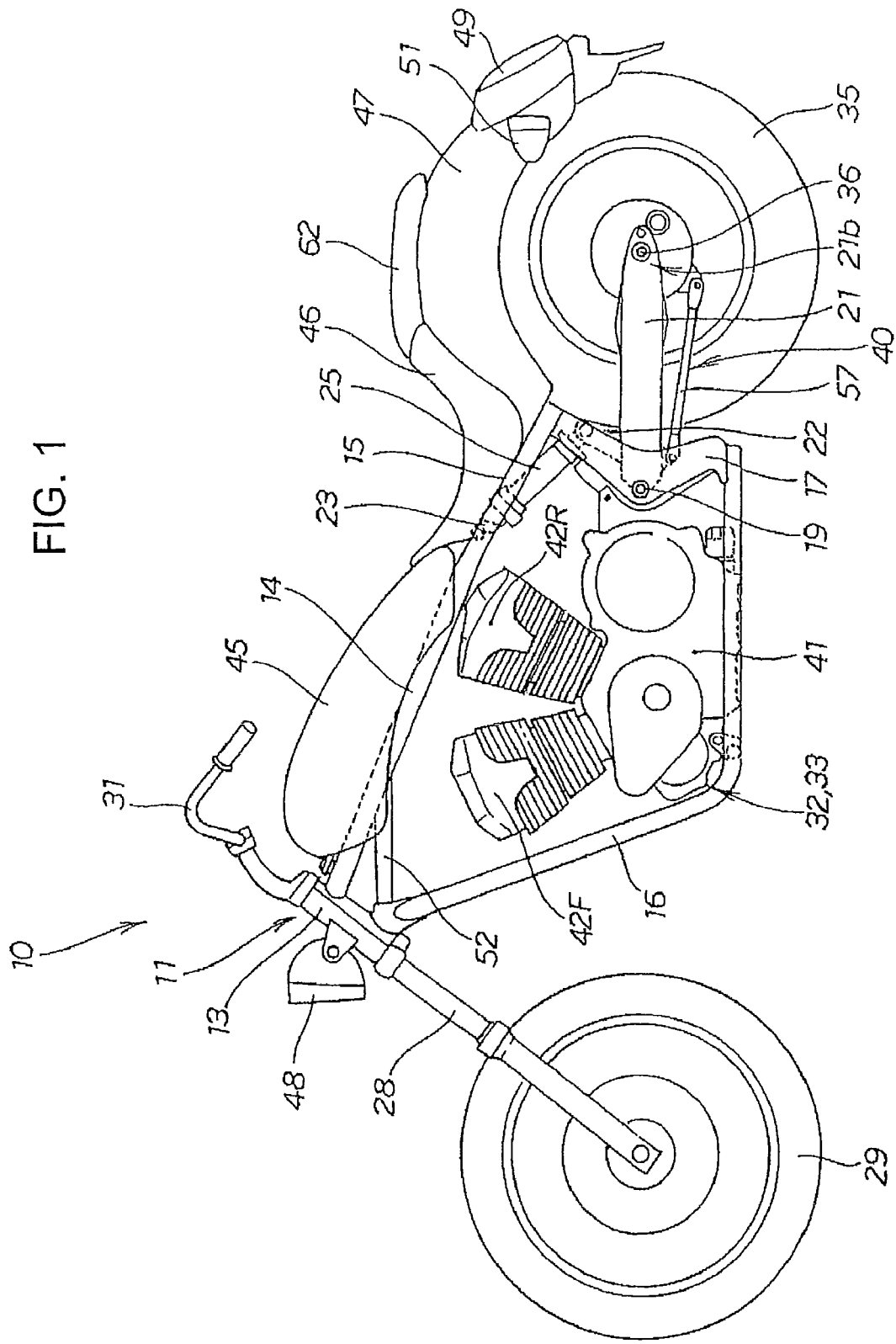
FIG. 1 is a left side view of a motorcycle that is an example of a vehicle using a shaft drive device according to an embodiment of the present invention.

As shown in FIG. 1, a motorcycle 10 includes a vehicle body frame 11.

The vehicle body frame 11 includes a head pipe 13 that is provided at the front end of a vehicle, a main frame 14 that is provided to extend from the head pipe 13 toward the rear side, seat rails 15 and 15 (as long as a pair of members is particularly required, only one of the members is shown hereinafter) that extend from the rear end portion of the main frame 14 toward the rear side, down frames 16 and 16 that extend obliquely downward from the head pipe 13, and rear frames 17 and 17 that connect the rear ends of the down frames 16 and 16 to the rear ends of the seat rails 15 and 15, respectively.

A pivot shaft 19 is rotatably connected to the rear frames 17 and 17, and a rear fork 21 is connected to the pivot shaft so as to swing up and down about the pivot shaft 19. A front portion 22 of the rear fork 21 and a rear portion 23 of the main frame 14 are connected to each other by a rear shock absorber 25.

A front fork 28 is steerably connected to the head pipe 13. A front wheel 29 is rotatably connected to the lower end of the front fork 28, and a steering handlebar 31 is connected to the upper portion of the front fork 28.

An engine 33 used as a power unit 32 is disposed in a space that is surrounded by the main frame 14 and the down frame 16, and a rear wheel 35 is rotatably connected to a rear end portion 21b of the rear fork 21. A shaft drive device 40, which transmits a driving force of the engine 33 to the rear wheel 35, is disposed between the engine 33 and a rear wheel axle 36 that supports the rear wheel 35.

The engine 33 is a V-type two-cylinder engine that includes a crankcase 41 and two cylinders 42F and 42R erected on the crankcase 41.

FIG. 1 also illustrates a fuel tank 45, a rider's seat 46, a rear fender 47, a headlight 48, taillight 49, rear winkers 51, 51, and a gusset 52 that reinforces the vehicle body frame 11.

Figure 2:
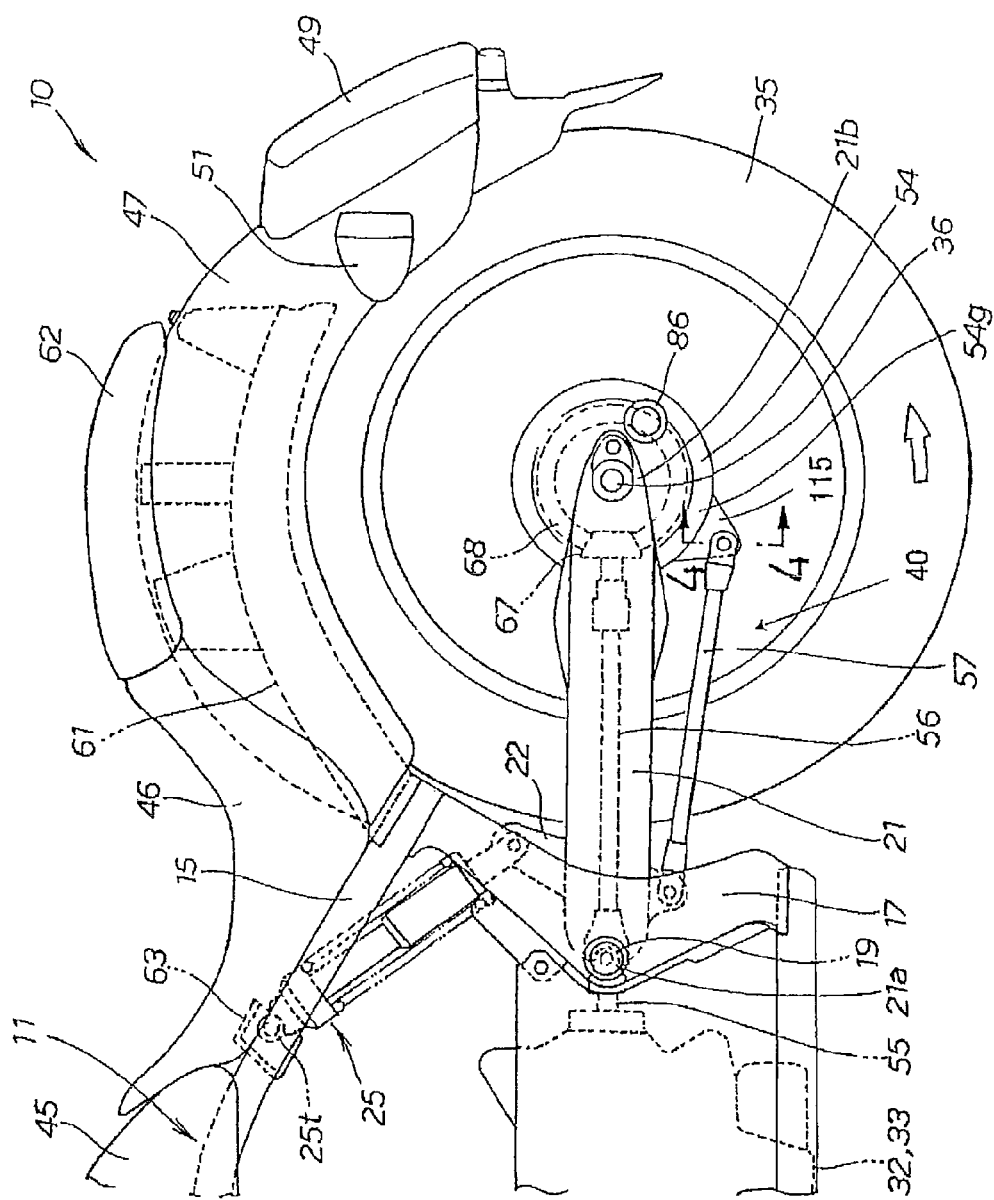
FIG. 2 is a left side view of a rear portion of the motorcycle.

As shown in FIG. 2, the shaft drive device 40 includes a gear case 54 that is provided on the side of the rear wheel 35, and a drive shaft 56 that is provided between the gear case 54 and an output shaft 55 of the engine 33 used as the power unit 32. The shaft drive device is a device that transmits the output of the engine 33 to the rear wheel 35 through the drive shaft 56 and the gear case 54.

The gear case 54 is supported by the rear wheel axle 36 that is provided at the rear end portion 21b of the rear fork 21, and the rotation of the gear case is prevented by a torque rod 57 that connects an outer circumferential portion 54g of the gear case 54 to the rear fork 21.

Meanwhile, a rear frame 61 extends rearward from the seat rails 15 and 15. A rear fender 47, a pillion 62, and the like are connected to the rear frame 61. An upper end portion 25t of the rear shock absorber 25, which is provided at the rear portion of the main frame 14, is held by a bracket 63.

The shaft drive device 40 is a device that changes the direction of a driving force of the drive shaft 56 and transmits the driving force to the rear wheel 35.

Figure 3:
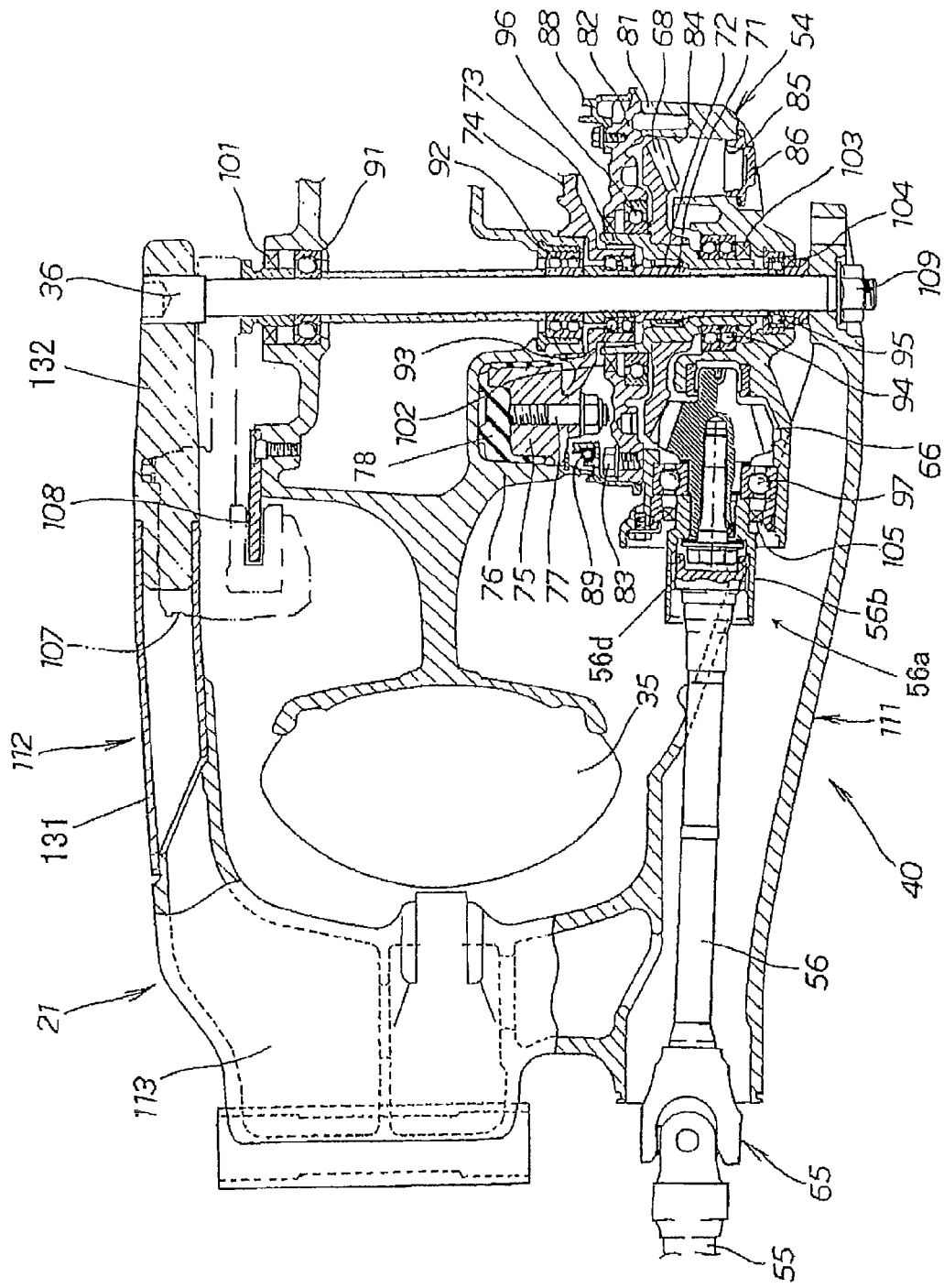
FIG. 3 is a cross-sectional view illustrating the shaft drive device and a peripheral portion thereof.

As shown in FIG. 3, the shaft drive device 40 includes the drive shaft 56 that is connected to the output shaft 55 of the engine (reference numeral 33 of FIG. 2) by a universal joint 65, a pinion gear 66 that is a drive gear fixed to the rear end portion of the drive shaft 56 by a joint 56a, a ring gear 68 that is a final driven gear engaged with the pinion gear 66 and changing the direction of the driving force, and the final gear case 54 that receives the gears 66 and 68.

Figure 5:
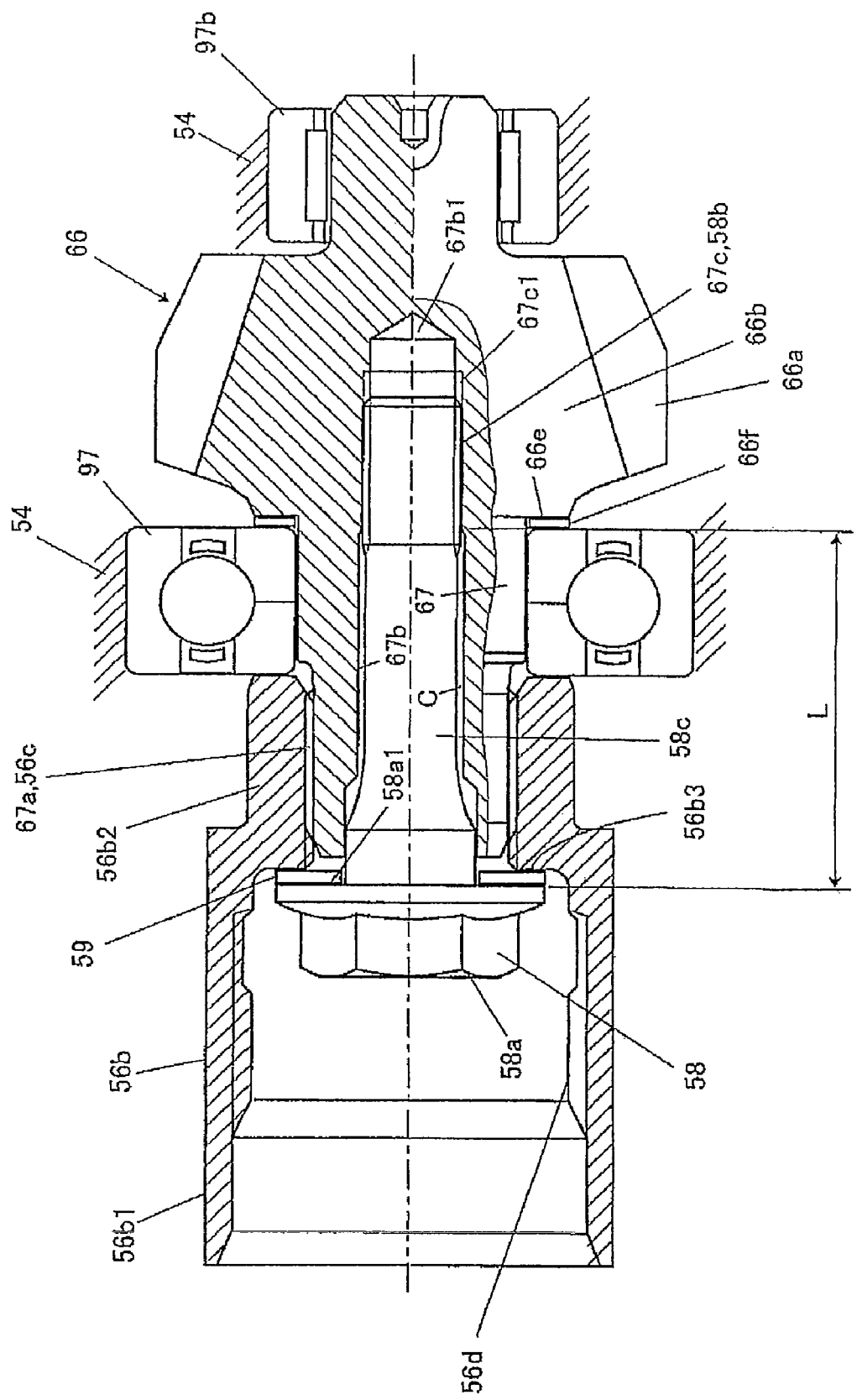
FIG. 5 is an enlarged cross-sectional view of main parts of FIG. 3.

As shown in FIGS. 3 and 5, the shaft drive device 40 according to the embodiment includes a shaft 67 of the pinion gear 66 engaged with the ring gear 68 extending toward the front side (toward the power unit 32) in the final gear case 54 that is provided in a power transmission system between a power unit and a wheel (the rear wheel 35 in this case). A spline 67a is provided on the outer circumference of the shaft 67, a spline 56c is provided on the inner circumference of a cylindrical portion of a pinion joint 56b that forms a receiving portion of the joint 56a provided at the rear end of the drive shaft 56 for transmitting power from the power unit to the pinion gear 66, and the spline 56c of the pinion joint 56b and the spline 67a of the pinion gear 66 are engaged with each other so that the pinion gear 66 is spline-connected to the pinion joint 56b. A hole 67b is formed at the shaft 67 of the pinion gear 66 in an axial direction thereof, and a threaded portion 67c is formed at a lower portion of the hole. The pinion joint 56b is fixed to the pinion gear 66 by a bolt 58 that is threadedly engaged with the threaded portion 67c of the hole 67b, and a flexible portion 58c is formed between a head portion 58a of the bolt 58 and a threaded portion 58b of the bolt 58.

The pinion joint 56b includes a large cylindrical portion 56b1 and a small cylindrical portion 56b2, and the spline 56c is provided on the small cylindrical portion 56b2. A spline 56d is provided on the inner circumference of the large cylindrical portion 56b1, and a spline (FIG. 3) provided at the rear end of the drive shaft 56 is engaged with the spline 56d.

An end 67b1 of the hole 67b of the pinion gear 66 is formed in a thick portion (large diameter portion) 66b on which teeth 66a of the gear 66 are formed, and at least an end 67c1 of the threaded portion 67c is also formed in the thick portion 66b. Accordingly, the thread-engagement strength between the pinion gear 66 and the bolt 58 is ensured and the length L of the flexible portion 58c is sufficiently ensured.

Further, a gap C is formed between the outer circumferential surface of the flexible portion 58c and the inner circumferential surface of the hole 67b of the pinion gear 66. Since the gap C exists, a space where the flexible portion 58c can be elastically deformed is ensured.

A stepped portion 66e is formed between the thick portion 66b and the shaft 67 of the pinion gear 66, and a bearing 97 is provided on the stepped portion 66e together with a shim 66f. The pinion gear 66 is rotatably supported by the gear case 54 by the bearing 97 and a needle bearing 97b provided at the end of the pinion gear 66 (see FIG. 3).

The bolt 58 is threadedly engaged with the pinion gear 66 while a washer 59 is interposed between the head portion 58a of the bolt and a lower portion 56b3 of the large cylindrical portion 56b1 of the pinion joint 56b, the bearing 97 and the small cylindrical portion 56b2 of the pinion joint 56b are tightened by a seating face 58a1 of the head portion 58a and the stepped portion 66e of the pinion gear 66. Accordingly, the bolt 58, the pinion joint 56b, the pinion gear 66, and the bearing 97 are firmly fixed to each other.

These are firmly fixed to each other, particularly, the small cylindrical portion 56b2 of the pinion joint 56b is pressed by the head portion 58a of the bolt 58 and the bearing 97, so that the oscillation of the pinion joint 56b to be described below is suppressed.

As shown in FIG. 3, the final driven gear (ring gear) 68 is press-fitted to a sleeve 73. The sleeve 73 is supported by bearings 94 and 96. A first damper presser 74 is fixed to the sleeve 73, and the first damper presser and the sleeve 73 are rotated as a single body. A second damper presser 75 is fixed to the first damper presser 74 by a bolt 77, and a damper 78 is fixed between the second damper presser 75 and a hub 76 of the rear wheel 35.

Further, a bearing 72 is disposed on the outer circumference of the rear wheel axle 36 with a spacer 71 interposed therebetween, and a final gear unit including the gear case 54 is supported by the bearing 72 and another bearing 95.

A shock absorber is provided between the ring gear 68 and the rear wheel 35. The shock absorber is the damper 78 in this embodiment. The damper 78 is interposed between the ring gear 68 and the hub 76 of the rear wheel 35, so that the torque of the drive shaft 56 is transmitted to the rear wheel 35 and the shock caused by the variation of the torque is reduced.

The gear case 54 includes a body 81 and a lid 82 that covers the body 81 from the inside of a vehicle toward the outside thereof. The lid 82 is aligned with the body 81 and then is fixed to the body by a fastener 83. A gear chamber 84 is formed in the gear case 54, and the ring gear 68 engaged with the pinion gear 66 and the pinion gear 66 is disposed in the gear chamber 84. The gear chamber 84 includes an oil injection hole 85, and oil is injected through the oil injection hole 85. Meanwhile, the oil injection hole 85 is usually closed by a cap 86.

A dust guard plate used as a ring member 88 is provided to the lid 82 from the inside, and a breather tube 89 that makes the gear chamber 84 communicate with atmosphere is connected to the ring member 88.

FIG. 3 shows bearings 91 to 94, 96, and 97, seal members 101 to 105, a disc brake unit 107, a disc brake plate 108, a nut 109 that fixes the rear wheel axle 36 to the rear fork 21.

The rear fork 21 includes an extension portion 111, an extension portion 112, and a cross portion 113 that connects the extension portion 111 to the extension portion 112.

The extension portion 111 and the cross portion 113 are integrally formed by casting. The extension portion 112 is formed by connecting a solid member 132 to a pipe member 131.

That is, the rear fork 21 is formed by connecting a plurality of members, and welding is used as a method of connecting the plurality of members. The rear fork 21 is formed by divided members, so that it is possible to easily perform the casting of the extension portion 111 and the cross portion 113.

Figure 4:
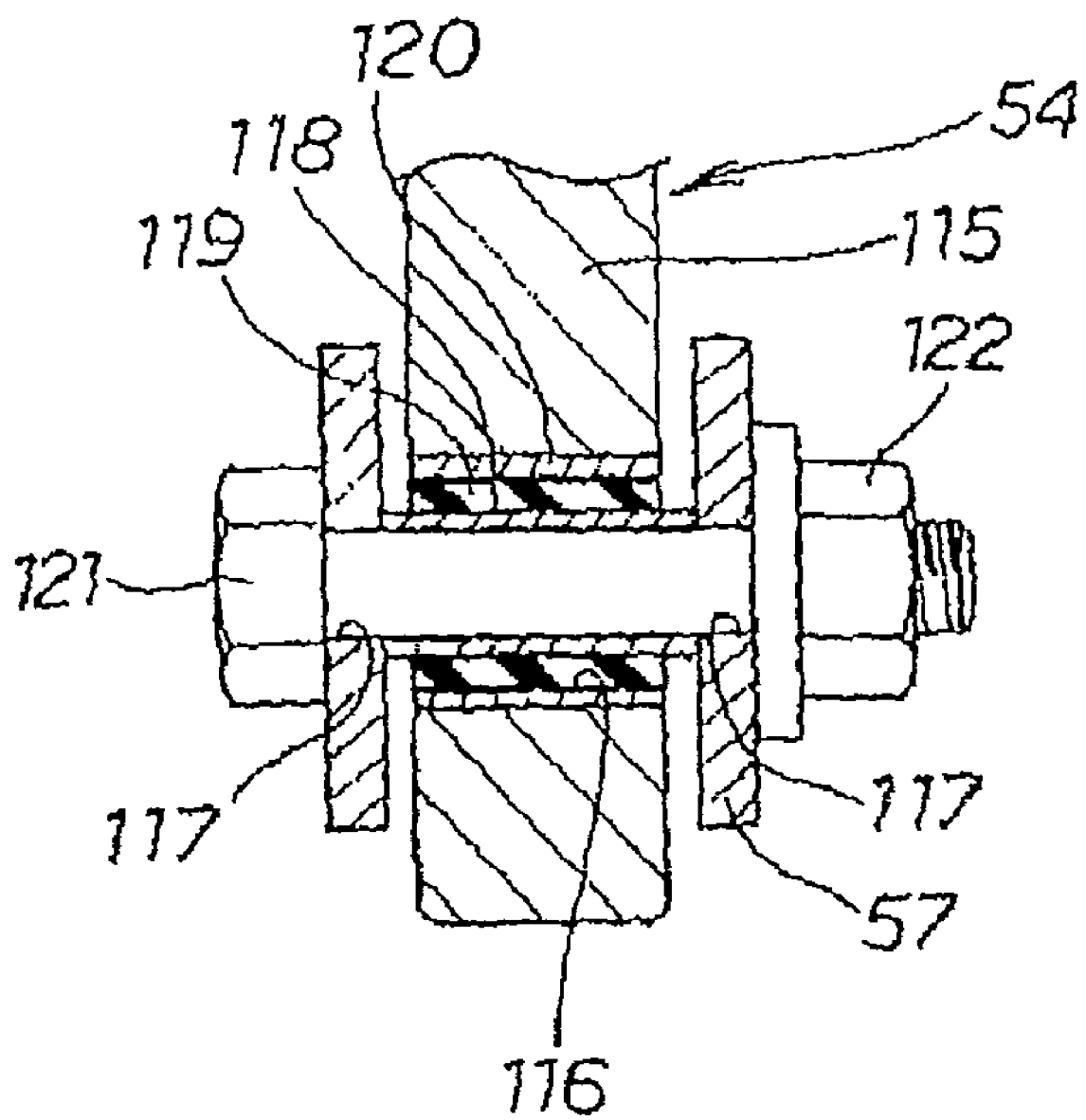
FIG. 4 is a cross-sectional view taken along line 4-4 of FIG. 2.

FIG. 4 is a cross-sectional view taken along line 4-4 of FIG. 2, and shows the structure for fixing the torque rod 57 to the gear case 54.

A flange 115 extends downward from the outer circumferential portion 54g of the gear case 54. A pipe 120, an elastic member 119, and a pipe member 118 are sequentially fitted to a hole 116 formed at the flange 115. Then, holes 117 and 117, which are formed at the furcated ends of the torque rod 57, are aligned with the center of the hole 116, and the torque rod 57 is connected to the gear case 54 by a bolt 121 and a nut 122.

That is, the torque rod 57 is connected to the gear case 54 with the elastic member 119 interposed therebetween. Since the torque rod 57 is connected to the gear case 54 with the elastic member 119 interposed therebetween, shock generated in a drive system can be absorbed by the elastic member 119. Since the generated shock can be absorbed by the elastic member 119, it is possible to reduce the size of the shock absorber such as a damper (reference numeral 78 of FIG. 3) provided in another part such as the hub 76 of the rear wheel. Alternatively, it is possible to omit the shock absorber that is provided in another part.

The elastic member 119 has been provided between the torque rod 57 and the gear case 54 in this embodiment, but the elastic member 119 may be provided between the torque rod 57 and the rear fork 21.

According to the above-mentioned shaft drive device 40, the following advantages are obtained.

In the shaft drive device 40, the hole 67b is formed at the shaft 67 of the pinion gear 66 in the axial direction thereof, the threaded portion 67c is formed at the lower portion of the hole, and the pinion joint 56b is fixed to the pinion gear 66 by the bolt 58 that is threadedly engaged with the threaded portion 67c of the hole 67b. According to the shaft drive device 40, the pinion gear 66 and the pinion joint 56b cannot slide relative to each other in the axial direction.

Therefore, noise or vibration, which is caused by the sliding of the pinion gear 66 and the pinion joint 56b, is not generated.

The pinion gear 66 and the pinion joint 56b cannot slide relative to each other in the axial direction as described above, but a small gap is formed between the spline 67a of the pinion gear 66 and the spline 56c of the pinion joint 56b. For this reason, when the shaft drive device 40 is operated and power is transmitted from the pinion joint 56b to the pinion gear 66 so that a vehicle travels, the pinion joint 56b slightly is swung on the engagement portion of the splines with respect to an axis of the pinion gear 66. The swing of the pinion joint 56b is referred to as oscillation.

Figure 6:
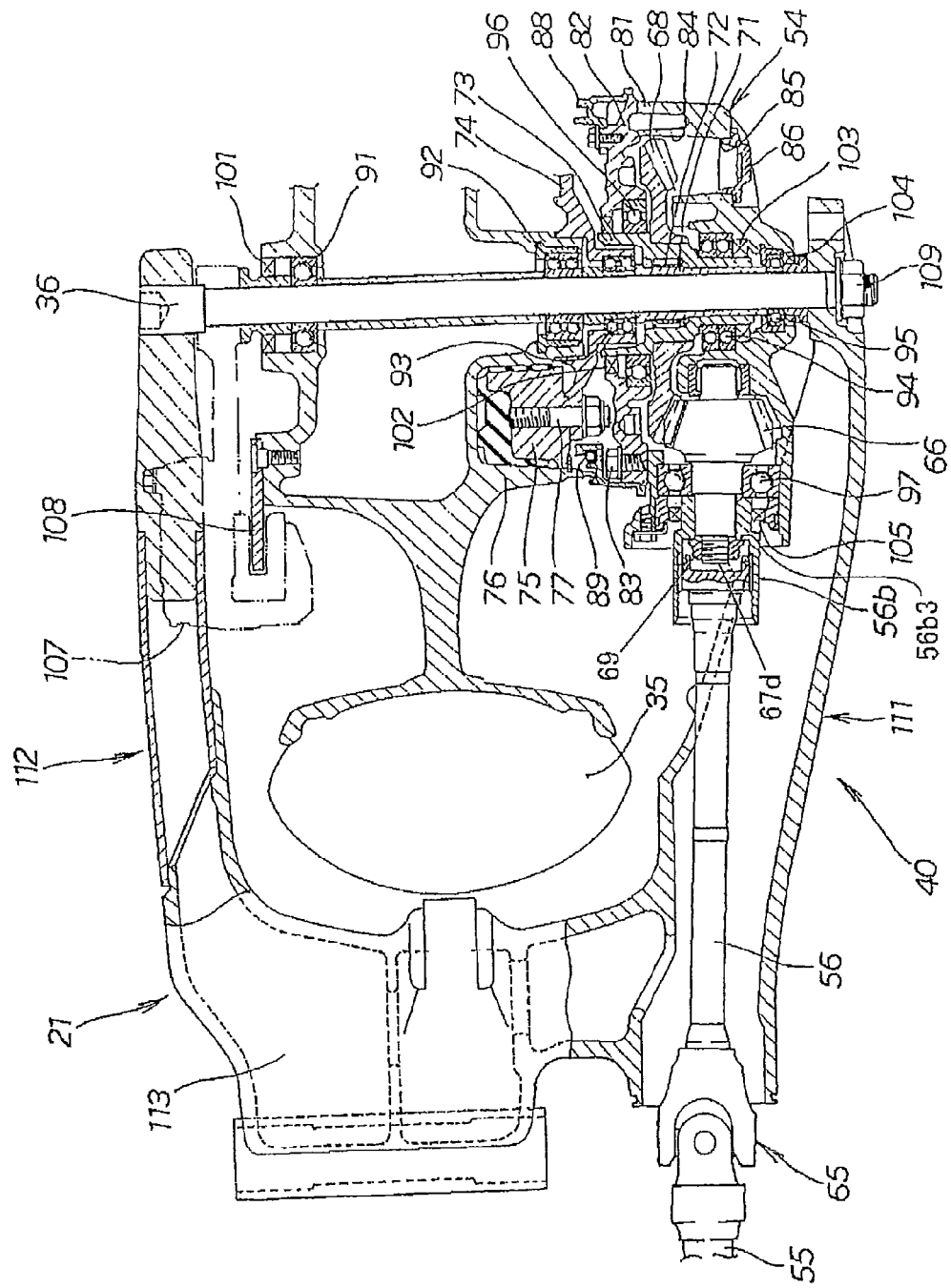
FIG. 6 is a cross-sectional view of a comparative example.

FIG. 6 is a view showing a comparative example.

In the structure shown in FIG. 6, a male threaded portion 67d is integrally formed with a shaft 67 of a pinion gear 66, and a nut 69 is threadedly engaged with the male threaded portion 67d, so that a pinion joint 56b is fixed to the pinion gear 66 by the nut 69.

Even in this structure, the pinion gear 66 and the pinion joint 56b cannot slide relative to each other in the axial direction in early times. Therefore, noise or vibration, which is caused by the sliding of the pinion gear 66 and the pinion joint 56b, is not generated.

However, in the case of the structure shown in FIG. 6, a force is applied to the pinion joint 56b in an oscillation direction, so that a force for loosening the thread engagement between the nut 69 and the male threaded portion 67d is applied from the lower portion 56b3 of the large cylindrical portion 56b1 of the pinion joint 56b. In this case, the force is directly applied to the threadedly engaged portion (67d) from the nut 69.

For this reason, in the case of the structure shown in FIG. 6, even though the pinion gear 66 and the pinion joint 56b are firmly fixed to each other in early times, the nut 69 is loosened since the pinion joint 56b is repeatedly oscillated due to the travel of a vehicle. Accordingly, the pinion gear 66 and the pinion joint 56b is apt to slide relative to each other in the axial direction. As a result, noise or vibration, which is caused by the sliding of the pinion gear 66 and the pinion joint 56b, is apt to be generated.

In contrast, according to the structure of this embodiment, the hole 67b is formed at the shaft 67 of the pinion gear 66 in the axial direction thereof, the threaded portion 67c is formed at the lower portion of the hole 67b, and the bolt 58 is threadedly engaged with the threaded portion 67c of the hole, so that the pinion joint 56b is fixed to the pinion gear 66. In this case, the flexible portion 58c is formed between the head portion 58a of the bolt 58 and the threaded portion 58b of the bolt 58. Accordingly, even though a force is applied to the pinion joint 56b in an oscillation direction and a force for loosening the threadedly engaged portion (67c, 58b) is thus applied to the seating face 58a1 of the head portion 58a of the bolt, the force is absorbed between the head portion 58a and the threaded portion 58b of the bolt by the flexible portion 58c of the bolt 58. Therefore, the surface pressure of the seating face 58a1 is maintained, so that the bolt 58 is hardly loosened. As a result, noise or vibration is not generated reliably.

The rotation of the final gear case 54 is prevented by the torque rod 57 that connects the rear fork 21 to the outer circumferential portion 54g of the final gear case 54 supported by the axle 36. Accordingly, as compared to a case where the other end of the torque rod of which one end is connected to the outer circumferential portion 54g of the final gear case 54 is connected to a vehicle body (for example, frame 17), it is possible to suppress the relative rotation of the final gear case 54 (therefore, pinion gear 66) and the pinion joint 56b and the oscillation of the pinion joint 56b. Therefore, the bolt is hardly loosened. As a result, it is possible to reliably prevent noise or vibration from being generated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shaft drive device where a shaft of a pinion gear engaged with a ring gear extends toward a power unit in a final gear case that is provided in a power transmission system between the power unit and a wheel, the shaft device comprising:
   a first spline provided on an outer circumference of the shaft;
   a second spline is provided on an inner circumference of a cylindrical portion of a pinion joint that forms a receiving portion of a joint provided at a rear end of a drive shaft for transmitting power from the power unit to the pinion gear, the second spline of the pinion joint and the first spline of the pinion gear being engaged with each other so that the pinion gear is spline-connected to the pinion joint;
   a hole formed at the shaft of the pinion gear in an axial direction thereof;
   a threaded portion formed at a lower portion of the hole,
   wherein the pinion joint is fixed to the pinion gear by a bolt that is threadedly engaged with the threaded portion of the hole, and
   wherein a flexible portion is formed between a head portion of the bolt and a threaded portion of the bolt.

2. The shaft drive device according to claim 1,
   wherein the wheel is a rear wheel that is supported at a rear fork, which is swingably provided at a vehicle body, by an axle, and
   wherein the final gear case is supported by the axle, and is held in place a torque rod that connects an outer circumferential portion of the final gear case to the rear fork.

3. The shaft drive device according to claim 1, wherein the pinion joint includes a large cylindrical portion and a small cylindrical portion, and the second spline is provided on the small cylindrical portion.

4. The shaft drive device according to claim 1, further comprising a third spline spline on the inner circumference of the large cylindrical portion, and a rear end of the drive shaft is engaged with the third spline.

5. The shaft drive device according to claim 4, wherein the head portion of the bolt is disposed between the second and third splines of pivot joint.

6. The shaft drive device according to claim 1, wherein an end of the hole of the pinion gear is formed in a thick portion on which teeth of the pinion gear are formed.

7. The shaft drive device according to claim 1, wherein the threaded portion at the lower portion of the hole is formed in a thick portion on which teeth of the pinion gear are formed.

8. The shaft drive device according to claim 1, further comprising a gap C formed between an outer circumferential surface of the flexible portion and an inner circumferential surface of the hole of the pinion gear, the gap C providing a space where the flexible portion can be elastically deformed.

9. The shaft drive device according to claim 1, wherein the pinion gear is rotatably supported by the final gear case the bearing and a needle bearing provided at the end of the pinion gear, and
   wherein pinion gear teeth are disposed between the bearing and the needle bearing.

10. The shaft drive device according to claim 1, wherein the head portion of the bolt is enclosed in the pivot joint.

11. The shaft drive device according to claim 1, further comprising: a torque rod that connects an outer circumferential portion of the final gear case to the rear fork; and
   an elastic member is interposed provided between the torque rod and the final gear case in order to suppress shock generated in a drive system.

12. A shaft drive device where a shaft of a pinion gear engaged with a Ting gear extends toward a power unit in a final gear case that is provided in a power transmission system between the power unit and a wheel, the shaft device comprising:
   a first spline provided on an outer circumference of the shaft;
   a second spline is provided on an inner circumference of a cylindrical portion of a pinion joint that forms a receiving portion of a joint provided at a rear end of a drive shaft for transmitting power from the power unit to the pinion gear, the second spline of the pinion joint and the first spline of the pinion gear being engaged with each other so that the pinion gear is spline-connected to the pinion joint;
   a hole formed at the shaft of the pinion gear in an axial direction thereof;
   a threaded portion formed at a lower portion of the hole,
   wherein the pinion joint is fixed to the pinion gear by a bolt that is threadedly engaged with the threaded portion of the hole, and
   wherein a flexible portion is formed between a head portion of the bolt and a threaded portion of the bolt, and
   wherein a bearing for supporting the pinion gear surrounds at least a portion of the flexible portion of the bolt.

13. The shaft drive device according to claim 12,
   wherein the wheel is a rear wheel that is supported at a rear fork, which is swingably provided at a vehicle body, by an axle, and
   wherein the final gear case is supported by the axle, and is held in place a torque rod that connects an outer circumferential portion of the final gear case to the rear fork.

14. The shaft drive device according to claim 12, wherein the pinion joint includes a large cylindrical portion and a small cylindrical portion, and the second spline is provided on the small cylindrical portion.

15. The shaft drive device according to claim 12, further comprising a third spline spline on the inner circumference of the large cylindrical portion, and a rear end of the drive shaft is engaged with the third spline.

16. The shaft drive device according to claim 15, wherein the head portion of the bolt is disposed between the second and third splines of pivot joint.

17. The shaft drive device according to claim 12, wherein an end of the hole of the pinion gear is formed in a thick portion on which teeth of the pinion gear are formed.

18. The shaft drive device according to claim 12, wherein the threaded portion at the lower portion of the hole is formed in a thick portion on which teeth of the pinion gear are formed.

19. The shaft drive device according to claim 12, further comprising a gap C formed between an outer circumferential surface of the flexible portion and an inner circumferential surface of the hole of the pinion gear, the gap C providing a space where the flexible portion can be elastically deformed.

20. The shaft drive device according to claim 12, wherein the pinion gear is rotatably supported by a needle bearing provided at the end of the pinion gear, and
   wherein pinion gear teeth are disposed between the bearing and the needle bearing.

* * * * *